United States Patent

Hall et al.

[11] 3,852,286
[45] Dec. 3, 1974

[54] DIHYDROINDANE CARBOXYLIC AND CYCLOHEXADIENE ACETIC ACIDS, ESTERS AND SALTS

[75] Inventors: Charles M. Hall; William J. Wechter, both of Kalamazoo, Mich.

[73] Assignee: The Upjohn Company, Kalamazoo, Mich.

[22] Filed: Feb. 16, 1973

[21] Appl. No.: 333,395

[52] U.S. Cl............ 260/247.2 R, 260/268, 260/469, 260/501.15, 260/501.17, 260/515 A, 424/308, 424/317
[51] Int. Cl...................... C07c 63/50, C07c 69/76
[58] Field of Search............. 260/515 A, 469, 247.2

[56] References Cited
UNITED STATES PATENTS

| | | | |
|---|---|---|---|
| 3,468,939 | 9/1969 | Kaltenbronn | 260/515 |
| 3,565,904 | 2/1971 | Juby et al. | 260/515 |
| 3,711,533 | 1/1973 | Hamilton | 260/515 |

Primary Examiner—James A. Patten
Attorney, Agent, or Firm—Martin B. Barancik; Roman Saliwanchik

[57] ABSTRACT

Fluoro, phenyl substituted cyclohexadiene compounds of FIGS. I and II

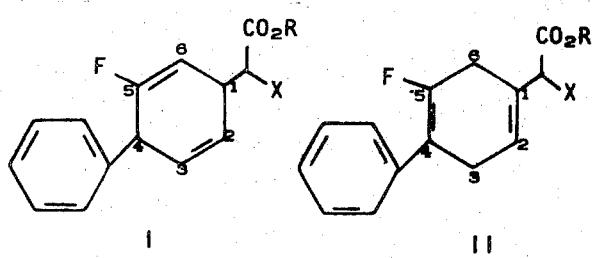

wherein R is selected from the group consisting of hydrogen, alkyl of from one to three carbon atoms, inclusive, and a pharmaceutically acceptable metal or amine cation;

X is selected from the group consisting of —$CH_3$ and —$CH_2CH_2$— with the proviso that —$CH_2$ is attached to the 2 carbon atom of the cyclohexadiene, thereby forming an indane type compound and compositions thereof useful as an anti-inflammatory, analgesic, anti-pyretic, anti-allergic, anti-thrombolytic and inhibitor of prostaglandin synthesis.

5 Claims, No Drawings

DIHYDROINDANE CARBOXYLIC AND CYCLOHEXADIENE ACETIC ACIDS, ESTERS AND SALTS

BRIEF DESCRIPTION OF THE INVENTION

In accordance with this invention there are the fluoro, phenyl substituted cyclohexadiene compounds of FIGS. I and II

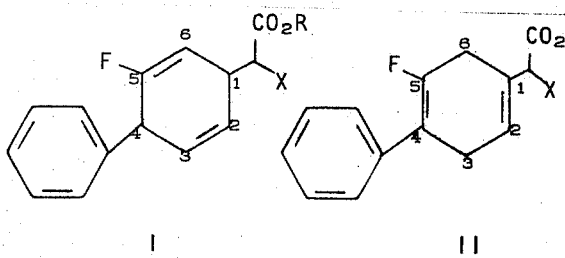

I    II wherein R is selected from the group consisting of hydrogen, alkyl of from one to three carbon atoms, inclusive, and a pharmaceutically acceptable metal or amine cation;

X is selected from the group consisting of —$CH_3$ and —$CH_2CH_2$— with the proviso that —$CH_2$ is attached to the two carbon atom of the cyclohexadiene, thereby forming an indane type compound.

Another aspect of the invention is the pharmaceutical composition having a compound of the invention as an active ingredient.

The compounds are useful as anti-inflammatory, analgesic or anti-pyretic agents, as an anti-allergy agent, as an anti-thrombolytic agent, and as an inhibitor of prostaglandin synthesis.

DETAILED DESCRIPTION OF THE INVENTION

As employed in the above disclosure and throughout the specification, the term "alkyl" includes methyl, ethyl, propyl, and isopropyl when limited to three carbon atoms. The term "a pharmaceutically acceptable metal or amine cation" includes alkali metals such as sodium and potassium, alkaline earth metals such as calcium and magnesium, and other acceptable metals such as aluminum and amine cations. The term "amine cation" includes all pharmaceutically acceptable amine cations, including, for example, cations of ammonia, tris(hydroxymethyl)amino-methane, D-threo-2-amino-1-p-nitrophenyl-1,3-propanediol, N,N-bis(hydroxyethyl)piperazine, 2-amino-2-methyl-1-propanol, 2-amino-2-methyl-1,3-propanediol, 2,2-bis(hydroxymethyl)-2,2′,2″-nitriloethanol, and morpholine.

The compounds of this invention can be prepared conveniently by reducing the aromatic analogue and separating the unsaturated isomers by chromatographic methods. For example, 6-fluoro-5-phenylindane-1-carboxylic acid, prepared as in the manner disclosed in U.S. Pat. application Ser. No. 300,283, is reduced in a dissolving metal reduction such as a solution of sodium in ammonia. The 6-fluoro-5-phenyl-5,7α-dihydroindane-1-carboxylic acid and the 6-fluoro-5-phenyl-4,7-dihydroindane-1-carboxylic acid isomers are separated by high pressure liquid chromatography and isolated.

In a similar manner, the α-methyl-5-fluoro-4-phenyl-cyclohexa-2,5-diene-1-acetic acid and α-methyl-5-fluoro-4-phenyl-cyclohexa-1,4-diene-1-acetic acid isomers are prepared from α-methyl-2-fluoro-4-biphenylacetic acid.

The esters or pharmaceutically acceptable metal or amine salts are prepared from the acid by standard methods.

The compounds of this invention can be administered in effective non-toxic quantities for the treatment of inflammatory conditions such as arthritis and for the treatment of pain and pyretic conditions.

The compounds can be used in the therapeutic or prophylactic treatment of allergy such as combatting the effects of an asthma attack or in prevention of an asthma attack. Its anti-thrombolytic activity is effective in situations wherein prevention of clot formation is important as following surgery so as to prevent post-operative thrombosis, preventing transcient cerebral ischemic attacks in geriatric patients, and prophylactic treatment following myocardial infarcts and strokes.

In use, the compounds of the invention are administered in formulations which comprise a compound of the invention in association with pharmaceutical excipients known for the production of compositions for oral, rectal or parenteral administration. These compositions preferably contain 0.1–90 percent by weight of a compound of the invention.

Compositions for oral administration are the preferred compositions of the invention, and these are the conventional pharmaceutical forms for such administration, such as, for example, tablets, capsules, pills, powders, effervescent granules, elixirs, syrups and aqueous and oil dispersions. The excipients used in the preparation of these compositions are the excipients known in the pharmacist's art. Thus in the preparation of tablets, typical excipients include disintegrating agents, e.g., corn starch and lubricating agents, e.g., magnesium stearate; in the preparation of capsules, standard gelatin capsules may be used containing the active ingredient alone or admixed with a diluent. The liquid compositions may comprise as excipients water and sucrose to provide syrups, water, dispersing agents and suspending agents, e.g., methylcellulose to provide aqueous suspensions, and a non-toxic oil, e.g., a vegetable oil such as peanut oil and a suspending agent to provide oily suspensions.

The optimum dosage range varies with the choice of active compound, the condition and weight of the patient, and the route of administration. The unit dose can vary from about 0.05 to about 2 mg. per kilogram per day. For oral administration the dosage rate is preferably 5–100 mg. per subject per day, most preferably 7–50 mg. per subject per day, optionally delivered in up to four divided doses.

We claim:

1. A compound selected from the group consisting of

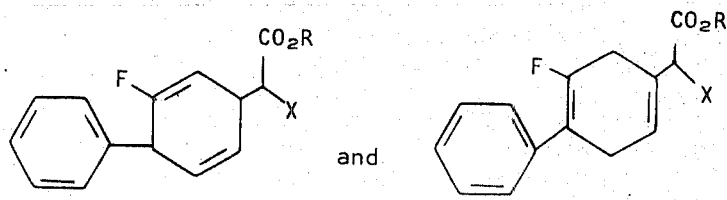

and wherein R is selected from the group consisting of hydrogen, alkyl of from one to three carbon atoms, inclusive, and a pharmaceutically acceptable metal or amine cation;

X is selected from the group consisting of —CH$_3$, and —CH$_2$CH$_2$— with the proviso that —CH$_2$ is attached to the two carbon atom of the cyclohexadiene, thereby forming an indane type compound.

2. 6-Fluoro-5-phenyl-5,7α-dihydroindane-1-carboxylic acid and its pharmaceutically acceptable salts according to claim 1.

3. 6-Fluoro-5-phenyl-4,7-dihydroindane-1-carboxylic acid and its pharmaceutically acceptable salts according to claim 1.

4. α-Methyl-5-fluoro-4-phenyl-cyclohexa-2,4-diene-1-acetic acid and its pharmaceutically acceptable salts according to claim 1.

5. α-Methyl-5-fluoro-4-phenyl-cyclohexa-1,4-diene-1-acetic acid and its pharmaceutically acceptable salts according to claim 1.

* * * * *